United States Patent
Stute

(10) Patent No.: US 7,187,859 B2
(45) Date of Patent: Mar. 6, 2007

(54) METHOD AND APPARATUS FOR MANUFACTURING CONTACT LENSES

(75) Inventor: Hank Stute, Queen Creek, AZ (US)

(73) Assignee: Paragon Vision Sciences, Inc., Mesa, AZ (US)

( * ) Notice: Subject to any disclaimer, the term of this patent is extended or adjusted under 35 U.S.C. 154(b) by 268 days.

(21) Appl. No.: 11/005,491

(22) Filed: Dec. 6, 2004

(65) Prior Publication Data

US 2006/0120705 A1 Jun. 8, 2006

(51) Int. Cl.
- G03D 13/00 (2006.01)
- B29C 65/00 (2006.01)
- B29D 11/00 (2006.01)
- B24B 13/00 (2006.01)

(52) U.S. Cl. .................. 396/661; 156/154; 264/1.1; 451/42

(58) Field of Classification Search ............... 396/661; 451/42; 156/154; 264/1.1
See application file for complete search history.

(56) References Cited

U.S. PATENT DOCUMENTS

| | | | |
|---|---|---|---|
| 3,700,761 A | 10/1972 | O'Driscoll et al. ......... 264/1.36 |
| 4,478,770 A | 10/1984 | Vofsi et al. .................. 264/2.1 |
| 4,619,082 A | 10/1986 | Dent et al. .................... 451/42 |
| 4,666,249 A | 5/1987 | Bauman et al. ......... 351/160 H |
| 4,686,798 A | 8/1987 | Petty et al. ................... 451/42 |
| 4,856,234 A | 8/1989 | Goins ........................... 451/42 |
| 5,205,076 A | 4/1993 | Vernon et al. ............... 451/218 |
| 5,474,489 A | 12/1995 | Vernon ......................... 451/42 |
| 5,494,474 A | 2/1996 | Vernon ......................... 451/364 |
| 5,888,122 A | 3/1999 | Gupta et al. .................. 451/42 |
| 5,931,068 A | 8/1999 | Council, Jr. et al. ......... 82/1.11 |
| 5,972,251 A | 10/1999 | Shannon ...................... 264/1.7 |
| 6,314,199 B1 | 11/2001 | Höfer et al. ................. 382/141 |
| 6,586,499 B2 | 7/2003 | Bonafine, Jr. et al. ...... 523/168 |
| 2002/0049028 A1 | 4/2002 | Council, Jr. et al. .......... 451/41 |
| 2002/0112805 A1 | 8/2002 | Bonafine, Jr. et al. ... 156/89.23 |
| 2002/0173846 A1 | 11/2002 | Blake et al. ............... 623/6.18 |
| 2003/0119944 A1 | 6/2003 | Bonafine, Jr. et al. ...... 523/168 |
| 2004/0002290 A1 | 1/2004 | Green .......................... 451/29 |

FOREIGN PATENT DOCUMENTS

| | | |
|---|---|---|
| CA | 2429893 | 6/2002 |
| JP | 10109316 | 4/1998 |
| JP | 11020035 | 1/1999 |
| JP | 11240030 | 9/1999 |

*Primary Examiner*—W. B. Perkey
*Assistant Examiner*—Rishi Suthar
(74) *Attorney, Agent, or Firm*—Snell & Wilmer L.L.P.

(57) ABSTRACT

The present invention is directed towards adhering a contact lens button on a fixture for use in shaping, forming and/or otherwise configuring a contact lens. For example, in accordance with one exemplary embodiment of the present invention, a combination of adhesive materials are used to adhere the lens to the fixture. For example, a first layer of water soluble adhesive is placed on the lens button. A second layer of non-water soluble adhesive is then placed on the first layer, and the button is mounted to the fixture. Both layers are subsequently removable by placing the button in a water bath, dissolving the water soluble layer and likewise separating the water insoluble layer.

9 Claims, 3 Drawing Sheets

METHOD AND APPARATUS FOR MANUFACTURING CONTACT LENSES

CROSS-REFERENCE TO RELATED APPLICATIONS

This application claims priority to U.S. patent application Ser. No. 11/005,493, filed on Dec. 6, 2004, entitled "METHOD AND APPARATUS FOR MANUFACTURING CONTACT LENSES," which is incorporated herein by reference.

FIELD OF INVENTION

This invention relates generally to the manufacture of contact lenses, and more particularly, to apparatus and methods used in the manufacture of contact lenses.

BACKGROUND OF THE INVENTION

Various methods of manufacturing contact lenses exist, for example, by lathing a lens from a disk (or button) of lens material. Typically, the button is mounted in a lathe collet and a back surface (corneal contacting) radius is formed. Subsequently, the button is then mounted by various means on a rounded end of a lens fixture, the rounded end having a curvature generally corresponding to that of the back surface radius of the button so that the front surface of the lens may be shaped. Additionally, various intermediate lathing operations, for example, cutting an edge chamfer in the button, cutting the lens to a desired thickness, and/or polishing the lens may also be performed.

In order to hold the button in place, typically, a single layer of adhesive (e.g., pitch, wax or the like) is applied or melted on the button and the button is placed on the tool. The adhesive hardens and secures the button to the tool. Generally speaking, the bond between the tool and the button must be strong enough to hold the button in place during manufacturing (e.g., lathing). Additionally, the adhesive must be strong enough that it will not flex under pressures exerted during the manufacturing operation performed on the button. However, notwithstanding the need to be strong to hold and resist flexure, it is desirable that the adhesive be removable, leaving a clean and undamaged lens surface.

Adhesive removal is accomplished by numerous means. For example, pitch removal is accomplished by physical removal (e.g., prying the pitch off, sonically dislodging it, etc.), cryogenic removal (freezing the pitch off), dissolving the pitch and/or melting the pitch. However, as newer lens materials have developed, the requirements for manufacturing the lenses have changed. For example, often, newer lens materials are softer, more flexible, more temperature sensitive, more sensitive to solvents and mechanical stress. Thus, traditional methods of removal of adhesive may suffer from various disadvantages.

For example, dissolving the adhesive with a solvent may damage the lens material. Additionally, with many of the known removal methods, time and temperature exposure to solvents must be precisely controlled, decreasing efficiencies and increasing manufacturing costs.

Water soluble waxes are desirable for use as an adhesive as the wax readily dissolves in a water bath, the water generally having few, if any, effects on the lens. Additionally, any remaining wax residues tend be readily removed with standard lens cleaners (e.g., those used by consumers). However, because water soluble waxes are softer and more flexible than traditional, non-soluble waxes and adhesives, the water soluble waxes generally cannot withstand the forces involved in lens manufacturing operations, particularly, high speed lathing operations.

Accordingly, a means for attaching a lens button to a lens fixture for manufacturing of contact lenses is desirable.

SUMMARY OF THE INVENTION

While the way in which the present invention addresses the disadvantages of the prior art will be discussed in greater detail below, in general, briefly, the present invention is directed towards adhering a contact lens button on a fixture for use in shaping, forming and/or otherwise configuring a contact lens. For example, in accordance with an exemplary embodiment of the present invention, a combination of adhesive materials are used to adhere the lens to the fixture. For example, a first layer of water soluble wax is placed on the lens button. A second layer of non-water soluble wax is then placed on the first layer, and the button is mounted to the fixture. Both layers are subsequently removable by placing the button, without or without the fixture, in a water bath, dissolving the water soluble layer and likewise separating the water insoluble layer from the lens button.

BRIEF DESCRIPTION OF THE DRAWINGS

Additional aspects of the present invention should become evident upon reviewing the non-limiting embodiments described in the specification taken in conjunction with the accompanying figures, wherein like numerals designate like elements, and.

DETAILED DESCRIPTION

Figure 1:
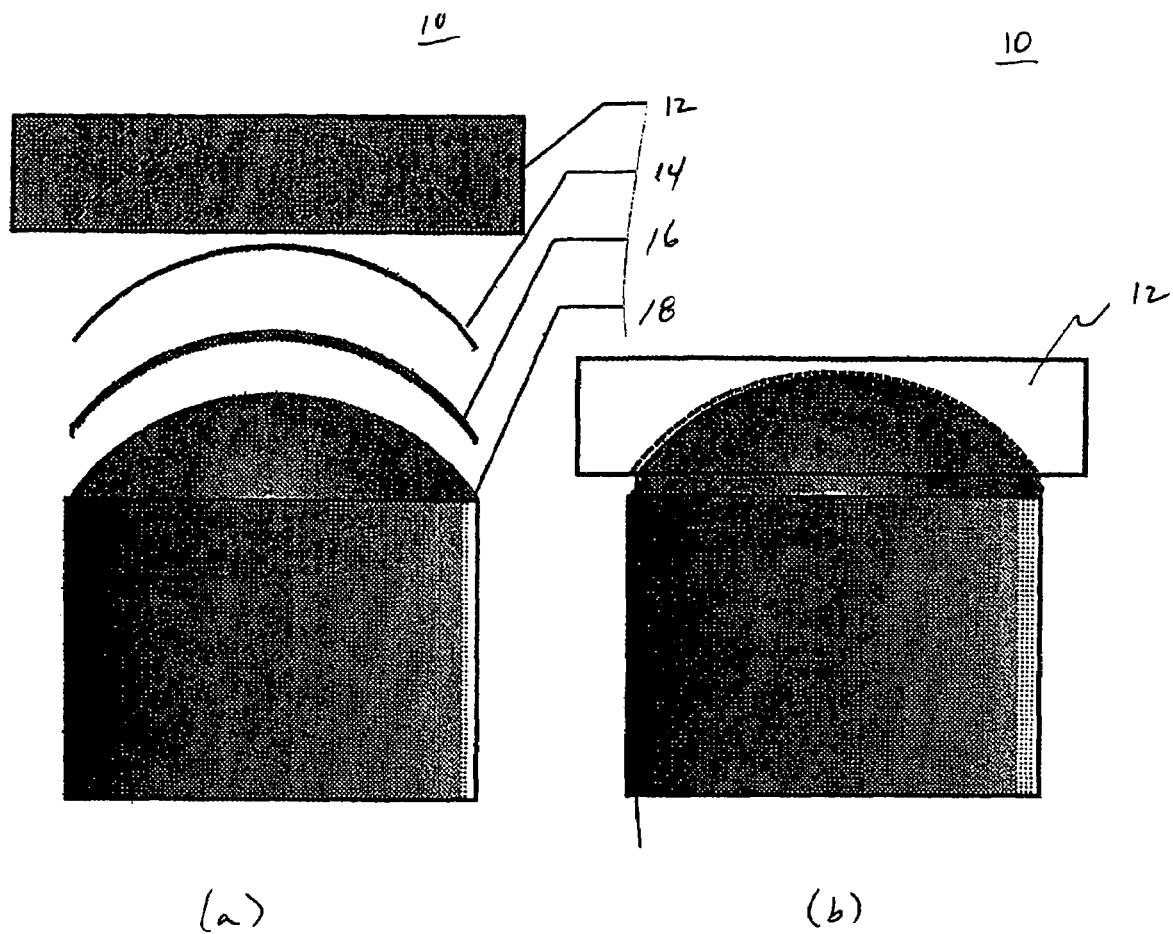
FIGS. 1(a)–(b) are side views of a combination of a lens button, adhesive layers, and a contact lens button fixture, in exploded and assembled views, in accordance with an exemplary embodiment of the present invention.

The following descriptions are of exemplary embodiments of the invention only, and are not intended to limit the scope, applicability or configuration of the invention in anyway. Rather, the following description is intended to provide convenient illustration for implementing various embodiments of the invention. As will become apparent, various changes may be made in the function and arrangement of the elements described herein without departing from the spirit and scope of the invention. For example, though not specifically described, various manufacturing operations may be performed on a contact lens button and should be understood to fall within the scope of the present invention. Similarly, though generally described herein with respect to lathing operation, as noted below, numerous other devices for machining contact lens may also benefit and fall within the scope of the present invention.

Briefly, various lathes are known in the art and are used to manufacture a lens from a disk (or button) of lens material (known or as yet unknown materials) by turning the button and removing and/or shaping the lens material. Lathes are relatively common devices used to turn lens buttons to shape them. However, various other lens shaping devices might also be used in the manufacture of contact lenses and likewise fall within the of the present invention. Nonetheless, the present invention is described herein in the context of lathing devices, though the invention should not be construed as so limited.

That said, various exemplary embodiments of the present invention are directed towards adhering a contact lens button on a fixture for use in shaping, forming and/or otherwise configuring a contact lens. For example, in accordance with an exemplary embodiment of the present invention, a combination of adhesive materials are used to adhere the lens to the fixture. In one non-limiting embodiment, a first layer of water soluble adhesive is placed on the lens button. A second layer of non-water soluble adhesive is then placed on the first layer, and the button is mounted to the fixture through adherence of the non-water soluble adhesive to the fixture. Both layers are subsequently removable by placing the button, whether still attached to the fixture or not, in a water bath, dissolving the water soluble layer and thus substantially separating the water insoluble layer from the button. Moreover, in accordance with another aspect of the present invention, in some instances the non-water soluble adhesive (e.g., pitch) remains attached to the fixture. In some instances, freezing or otherwise substantially reducing the temperature of the fixture/pitch combination causes different contraction rates between the fixture and the pitch. The different rates of contract then cause the pitch to be easily removed from the fixture as they no longer have similar shapes.

FIGS. 1(a) and (b) illustrate an exemplary embodiment of a combination 10 (in exploded and assembled form) of adhesive layers, a lens button and a fixture, in accordance with the present invention. For example in this embodiment, combination 10 comprises a contact lens button 12, a layer of water soluble adhesive 14 on said lens button, and a layer of a non-water soluble adhesive 16 on said water soluble layer. Combination is adhered to a fixture 18 which is suitably used in conjunction with a lens machining device (such as is described below with respect to a fixture positioning mechanism).

After various manufacturing steps are taken with respect to combination 10 (e.g., to create a base curve), which may also include any number of high speed lathing operations, and which may require combination 10, including fixture 18, to be repeatedly removed and replaced in the lens manufacturing device, combination 10 is placed in a water solution. As used herein, water solution generally is a distilled or purified water bath. However, water solution may comprise any number of liquids in which water soluble adhesive layer 14 will dissolve in, yet which will have little, if any effect on button 12. For example, water solution may further comprise water and one or more detergents which assist in dissolving water soluble adhesive layer 14.

After placement in water solution, as noted above, water soluble layer 14 dissolves. As layer 14 is sandwiched between button 12 and non-water soluble layer 16, after layer 14 dissolves, non-water soluble layer no longer is attached to button 12. Accordingly, a substantially clean lens button 12 results from processing button 12 using combination 10. Moreover, various further benefits of adhesive combinations in accordance with the present invention include the adhesive acting to fill interfacial voids which may exist between the button and the tool because of differences in the curvature of the end of the tool and the button. As such, an exact match between the curvature of the button and the end of the tool is not necessary.

As should be apparent to one skilled in the art, numerous materials may be used for adhesive layers 14, 16. For example commonly known, or as yet unknown, water soluble materials include impression waxes such as those manufactured by Kerr Products or Mixxy Compound™ manufactured by Mizzy, Inc. Similarly, commonly known, or again, as yet unknown, non-water soluble materials include various waxes and pitches such as Perfect Block™ or Opti-Block™, both manufactured by PolyChem, Inc. Further still, though not specifically described herein, additional adhesive layers may be used between button 12 and fixture 18 depending on desired characteristics, and still fall within the scope of the present invention.

Now, as noted above, often, depending on the type of lathing or polishing operations performed on the lens, the lens fixture may need to be removed from the lathe one or more times prior to finishing the lens. Such mounting and removal of the lens fixture from lathe generally require subsequent readjustment of the lens button and/or fixture within the lathe in order to ensure proper forming of the lens in subsequent operations to, for example, maintain the proper alignment between the base curve block and the front curve block.

In the context of a lathe, in accordance with an embodiment of the present invention, the button is mounted on a lens button fixture, and the fixture is inserted into a lathe collet. The lathe collet rotates and a lens machining tool is used to shape the button. A lens button fixture for use in a lens machining tool used in the manufacture of contact lenses comprises a fixture positioning mechanism for locating the lens button fixture in substantially the same location on the lens machining tool upon removal and replacement.

For example, as illustrated in U.S. application Ser. No. 11/005,493, filed Dec. 6, 2004, which is hereby incorporated by reference, a lens button fixture is used in a lens machining tool such as a lathe. In accordance with various exemplary embodiments of the present invention, the fixture has a base with a lens retaining end for holding a contact lens button and a fixture positioning mechanism for locating the lens button fixture in substantially the same location on the lens machining tool upon removal and replacement of the lens button fixture.

Figure 2:
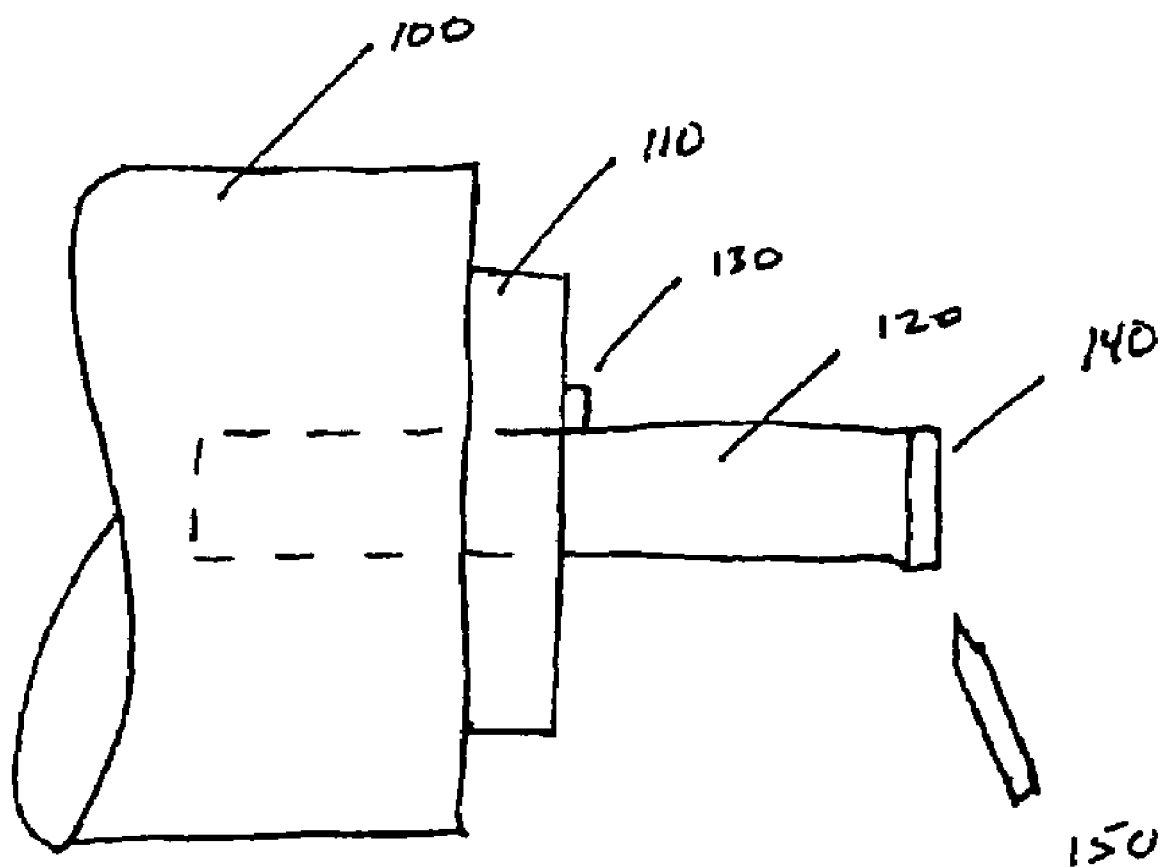
FIG. 2 is a side view of a contact lens manufacturing device, collet, contact lens fixture, contact lens positioning mechanism, contact lens button and contact lens manufacturing tool in accordance with an exemplary embodiment of the present invention.
Figure 3:
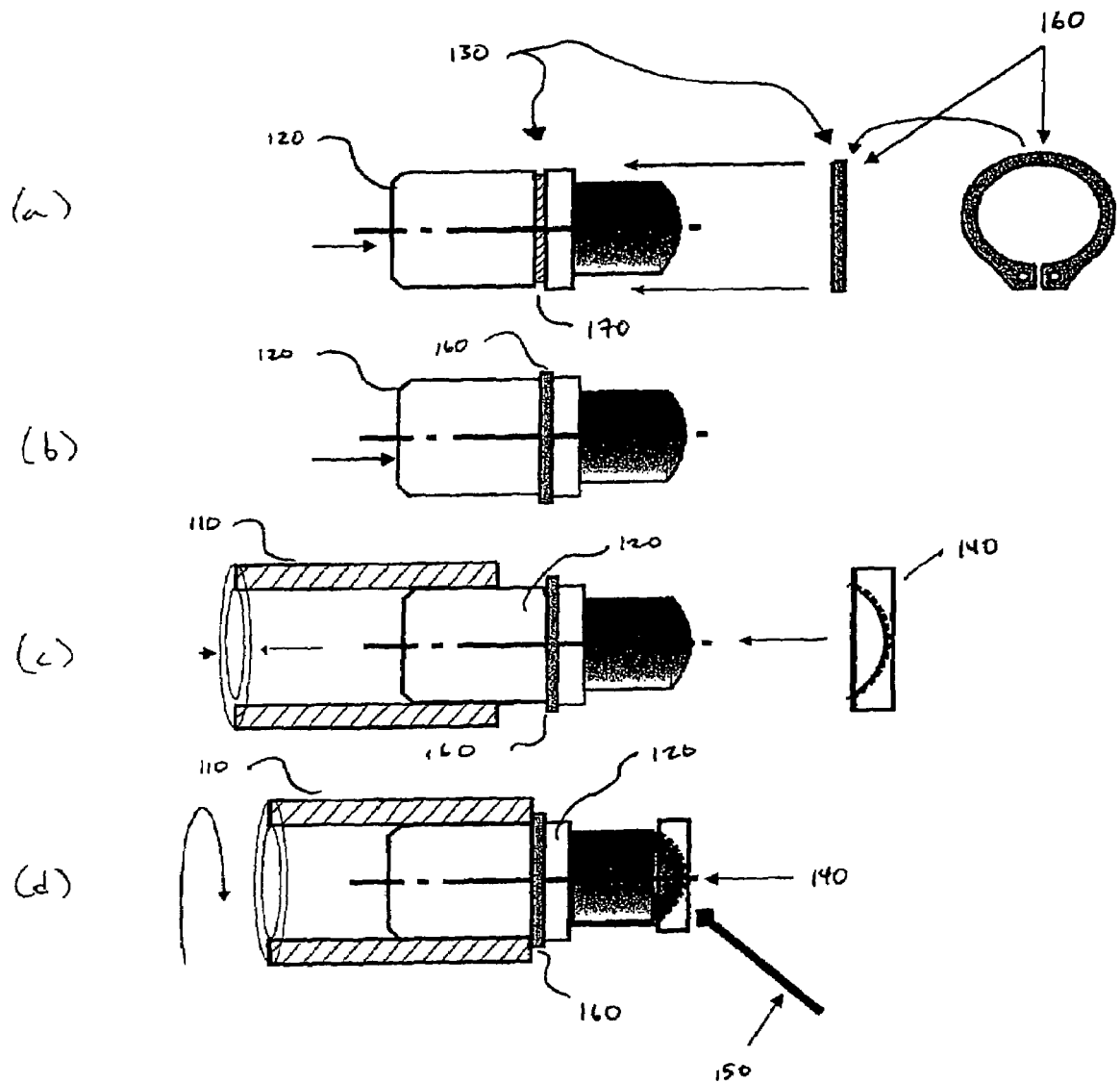
FIGS. 3(a)–(d) are side views of an exemplary embodiments of the present invention, exploded and assembled, comprising a collet, lens fixture, snap-ring and groove lens fixture positioning mechanism, lens button and tool.

For example, in an exemplary embodiment of the present invention and with reference to FIG. 2, a typical lens manufacturing operation in accordance with the present invention comprises tooling including a lathe 100 (or other lens manufacturing device), a collet 110, lens button fixture 120, fixture positioning mechanism 130, lens button 140 and a lens shaping tool 150.

In this exemplary embodiment, collet 110 is a mechanism for securing fixture 120 in a manner which facilitates removal and replacement of fixture 120. In this embodiment, in the context of a lathe, lathe 100 rotates button 140 by translating rotation of collet 110 to fixture 120 and thus, to button 140. As such, collet 110 and fixture 120 are preferably cylindrical members, substantially centered at the rotation center of lathe 100, though one skilled in the art will appreciate that any number of shapes and configurations of the components of the present invention may likewise be used to facilitate rotation of button 140.

With continued reference to FIG. 2, collet 110 suitably provides the ability to center fixture 120 with respect to lathing operations. Additionally, in accordance with various embodiments of the present invention, collet 110 suitably provides "quick-release" abilities for fixture 120. For example, in the presently described embodiments, collect 110 has a cylindrical aperture which receives substantially similarly shaped fixture 120. In this embodiment, collet 110 is suitably configured with a locking mechanism (e.g., a set screw) which is tightened on fixture 120.

Alternatively, collet 110 may be provided with a centered, tapered aperture and fixture 120 has a tapered shape which substantially conforms to collet 110. Thus, when fixture 120 is placed within the aperture of collet 110, fixture is suitably secured enough to facilitate rotation of button 140, but not so secure as to create difficulties in removing fixture 120.

It should be understood however, that in various alternative embodiments, collet 110 may take various other configurations which facilitate translating rotation of lathe 100 to fixture 120 and thus, to button 140. For example, collet 110 may comprise a mechanism such as a "chuck" (e.g., 3 or 4 jaw chuck), which suitably secures fixture 120. Alternatively, collet 110 may be suitably omitted from embodiments of the present invention. For example, fixture 120 may be secured directly to lathe 100. In such embodiments, upon rotation of lathe 100, rotational energy is translated directly to fixture 120 (and button 140) from lathe 100.

With continuing reference to FIG. 1, fixture 120 suitably provides or cooperates with a mechanism (such as adhesive layers as described above) for mounting button 140 during shaping, manufacturing and/or forming operations. In various embodiments of the present invention, lens shaping tool 150 generally comprises any tool, known or as yet unknown, used for shaping, cutting, forming, polishing or otherwise manufacturing contact lenses. For example, as noted above, in various exemplary lens manufacturing operations, a back surface (corneal contacting) radius is formed in button 140. Subsequently, button 140, now having a curved back surface, is then mounted, by various means now known or as yet unknown in the art, such as using adhesive combinations such as those described above on the end of lens fixture 120.

Upon securing button 140 to fixture 120, various operations may be performed on the front surface and sides of the button 140 to create a desired shape of the lens (e.g., base curve or the like). Similarly, any number of various intermediate operations, for example, cutting an edge chamfer in the button 140, cutting button 140 to a desired thickness, and/or polishing button 140 may also be performed.

As noted above, fixture 120 may be repeatedly removed and/or replaced during and in between operations performed on button 140. In accordance with various embodiments of the present invention, fixture 120 comprises a positioning mechanism 130 which suitably provides the ability to replace fixture 120 in collet 110 (or other portion of lathe 100 or other lens manufacturing tool) in substantially the same location.

For example, in accordance with an exemplary embodiment of the present invention, positioning mechanism 130 comprises a raised portion on an outer surface of fixture 120, which prevents fixture 120 from being further inserted into collet 110. As such, when fixture 120 is removed from collet 110 and subsequently reinserted, fixture 120 stops at the same position as when previously inserted.

With reference to FIGS. 3(a)–(d), in accordance with an exemplary embodiment of the present invention, positioning mechanism 140 comprises an axial ring which encircles fixture 120. The axial ring is suitably secured, preferably releasably, to fixture 120 in a manner which prevents the ring from moving laterally along fixture 120.

In accordance with various embodiments of the present invention, fixture positioning mechanism 130 is adjustable to variably set the position of fixture 120. For example, in the context of an axial ring embodiment, the axial ring may slide along the length of fixture 120 until suitably secured. Securing of axial ring is suitably accomplished by any mechanism which prevents ring from sliding along fixture 120. For example, set screws, clamps and similar mechanisms capable of which tighten positioning mechanism 130 to fixture 120 may be used in accordance with the various embodiments of the present invention. Alternatively, in accordance with another embodiment of the present invention and with specific reference to FIGS. 3(a)–(d), positioning mechanism 140 comprises a snap-ring 160 and groove 170 configuration, wherein snap-ring 160 seats in groove 170, thus preventing movement of positioning mechanism 140 and, accordingly, fixture 120, upon removal and reinsertion into lathe/collet 100/120.

Lastly, various aspects of the invention have been described in illustrative embodiments. Of course, many combinations and modifications of the above-described structures, arrangements, proportions, elements, materials and components, used in the practice of the invention, in addition to those not specifically described, may be varied and particularly adapted to specific environments and operating requirements without departing from those principles.

I claim:

1. A method for securing a lens button to a lens machining tool fixture, comprising the steps of:
    applying a layer of water soluble adhesive to a lens button;
    applying a layer of a non-water soluble adhesive to said water soluble layer; and
    using said non-water soluble layer to adhere the lens button to the tool fixture.

2. A method for securing a lens button to a lens machining tool fixture in accordance with claim 1, further comprising the steps of inserting the tool fixture into a lens manufacturing machine and shaping the lens button.

3. A method for securing a lens button to a lens machining tool fixture in accordance with claim 2, further comprising the steps of:
    removing the lens button from the tool fixture; and
    placing the lens button in a water solution to dissolve said water soluble layer, thereby removing said non-water soluble layer from the lens button.

4. A method for manufacturing a contact lens, comprising the steps of:
    applying a layer of water soluble adhesive to a lens button;
    applying a layer of a non-water soluble adhesive to said water soluble layer;
    using said non-water soluble layer to adhere the lens button to a tool fixture;
    inserting said tool fixture into a lens manufacturing machine;
    shaping said lens button;
    removing said lens button from said tool fixture; and
    placing said lens button in a water solution to dissolve said water soluble layer, thereby removing said non-water soluble layer from said lens button.

5. A method for securing a lens button to a lens machining tool fixture in accordance with claim 4, further comprising the steps of finish cleaning said lens button.

6. A contact lens button and adhesive combination used in the manufacture of contact lenses, comprising:
    a contact lens button;
    a layer of water soluble adhesive on said lens button; and
    a layer of a non-water soluble adhesive on said water soluble layer.

7. A contact lens button and adhesive combination in accordance with claim 6, wherein said water soluble layer is wax.

8. A contact lens button and adhesive combination in accordance with claim 6, wherein said non-water soluble layer is pitch.

9. A contact lens button and adhesive combination in accordance with claim 6, wherein said water soluble layer is wax and said non-water soluble layer is pitch.

* * * * *